United States Patent [19]

Fintel

[11] Patent Number: 5,439,623
[45] Date of Patent: Aug. 8, 1995

[54] METHOD FOR INTRODUCING ADDITIVES INTO AN EXTRUDER

[75] Inventor: William A. Fintel, Lewes, Del.

[73] Assignee: E. I. Du Pont de Nemours and Company, Wilmington, Del.

[21] Appl. No.: 236,749

[22] Filed: Apr. 29, 1994

[51] Int. Cl.6 .......................... B29C 47/92; D01F 1/04
[52] U.S. Cl. ................... 264/40.1; 264/40.7; 264/140; 264/211; 264/349
[58] Field of Search ............... 264/40.1, 40.7, 140, 264/211, 349

[56] References Cited

U.S. PATENT DOCUMENTS

| | | | |
|---|---|---|---|
| 3,530,754 | 9/1970 | Kalman | 83/355 |
| 4,848,915 | 7/1989 | Fintel | 366/76 |
| 4,919,872 | 4/1990 | Fintel | 264/103 |

FOREIGN PATENT DOCUMENTS 1119199 7/1968 United Kingdom .

OTHER PUBLICATIONS

Translation of Fed. Rep. of Germany 3,523,661 (Published Jan. 8, 1987).

Primary Examiner—Leo B. Tentoni

[57] ABSTRACT

This invention relates to a method for controlling the introduction of additives, in the form of a plurality of strands, to a cutter. The strands are cut into pellets, and the pellets are fed to an extruder for making thermoplastic shaped articles. The feeding of the strands to the cutter and extruder involves feeding the strands through a metering device and calculating the feed rate, velocity, and delta position for each strand per feed interval in order to obtain the desired amount of additive in the resulting thermoplastic article.

14 Claims, 4 Drawing Sheets

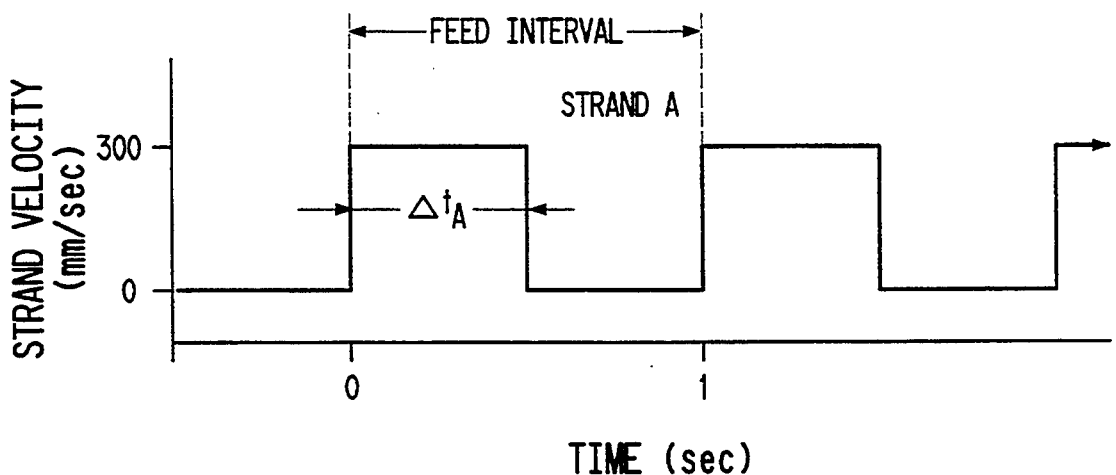
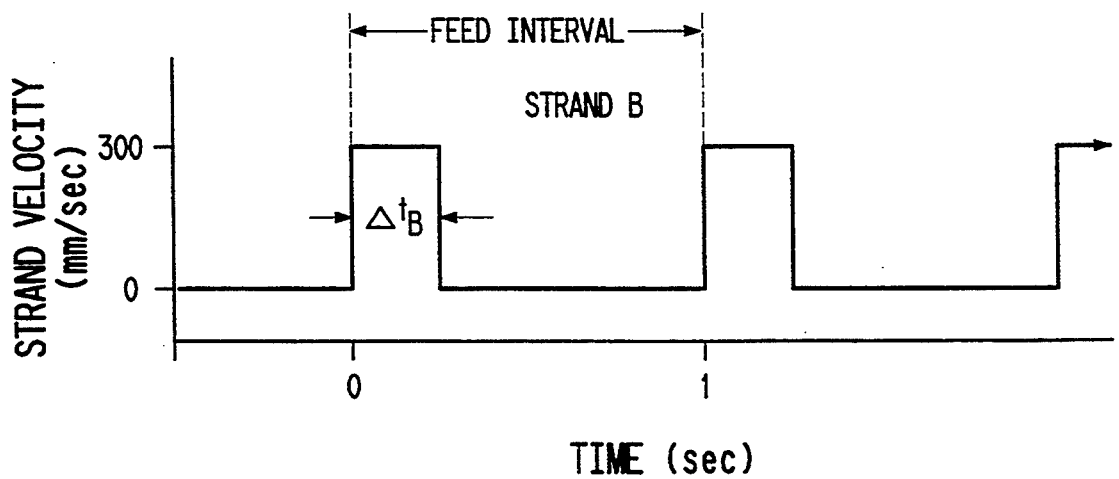

METHOD FOR INTRODUCING ADDITIVES INTO AN EXTRUDER

FIELD OF THE INVENTION

This invention relates to a method for controlling the introduction of additives into an extruder for the manufacture of thermoplastic shaped articles such as fibers containing said additives.

BACKGROUND OF THE INVENTION

Additives such as pigments, dyes, stabilizers, catalysts, flame retardants and antimicrobial agents are often mixed with molten thermoplastic polymers prior to extruding the polymer into a shaped article. These additives may be in the form of concentrated dispersions of additive in a carrier polymer, the carrier polymer being compatible with the thermoplastic polymer to be extruded. There are several known methods of introducing additive concentrates to a thermoplastic polymer.

One method is to meter a pelletized additive concentrate into the throat of an extruder using either gravimetric or volumetric feeders. This method is costly, difficult to control and results in a large amount of waste polymer when transitioning between additive concentrates.

Another method of introducing additive concentrates into a thermoplastic polymer is to first melt the concentrate and then meter the liquid concentrate into the molten thermoplastic polymer. This method is easy to control and can result in less waste polymer when transitioning between additive concentrates. However, the cost of melt addition equipment is high.

Another method of introducing additives into a thermoplastic polymer is to meter the additives in the form of concentrate strands to a cutting means which forms additive pellets which are then gravity fed into an extruder. Such processes are described in U.S. Pat. Nos. 3,530,754; 4,848,915; 4,919,872 and German Patent No. DE 3523661. These processes are most versatile when more than one additive concentrate strand, containing different additives, are simultaneously metered to a cutter to form pellets which are fed to an extruder. However, it is difficult to accurately control the simultaneous feeding of several strands at different rates to the cutter in these processes. It is especially difficult when the feed rate of one strand is much slower than the feed rate of the other strand(s). The slower moving strand is cut into light weight "fines" rather than pellets. These fines are not easy to gravity feed into the extruder and the additive level in the extruded product may be unacceptably non-uniform with time.

Accordingly, it is an object of this invention to accurately control the feeding of additives in the form of a plurality of strands to a cutter for making thermoplastic shaped articles.

SUMMARY OF THE INVENTION

This invention relates to a method for introducing additives into an extruder for making thermoplastic shaped articles comprising the steps of feeding additives in the form of a plurality of strands to a cutter. Each strand is cut into pellets and the pellets are then fed to the extruder, wherein they are mixed with the molten thermoplastic polymer.

The feeding of the strands to the cutter is controlled by the steps comprising:

a) calculating a feed rate for each strand, said feed rate being different for at least two of the strands;

b) calculating a velocity for each strand, said velocity being the same for each strand;

c) calculating a delta position for each strand per feed interval, said delta position being different for at least two of the strands; and d) feeding each strand at the calculated velocity for the time needed to move the calculated delta position per feed interval.

The feed rate may be based on a recipe comprising the desired amount of additive in the extruded article and strand properties, and this recipe may be recalled from a computer database. The velocity for each strand may be based on the velocity of the cutter which is preferably constant and the desired pellet length which is preferably about the same length for each strand. The velocity of the cutter and desired pellet length may also be recalled from a computer database. Preferably, the cutter is a rotary cutter. Each strand is fed through a separate pair of feed rolls prior to the cutter, where the delta position for each strand is obtained by the movement of the feed rolls. The movement of the feed rolls is based on the strand velocity, strand feed rate and polymer extrusion rate. The movement of the feed rolls may be controlled by a computer so that each pair of feed rolls moves the strand at the calculated strand velocity for the necessary period of time to move the strand its calculated delta position.

Preferably, the additives are color concentrates comprising pigments dispersed in a polymer matrix, and the extruded thermoplastic shaped article is a colored fiber.

BRIEF DESCRIPTION OF THE DRAWINGS

FIG. 4A is a timing diagram for a strand "A" being advanced to a cutter.

FIG. 4B is a timing diagram for a strand "B" being advanced to a cutter.

DETAILED DESCRIPTION OF THE INVENTION

Figure 1:
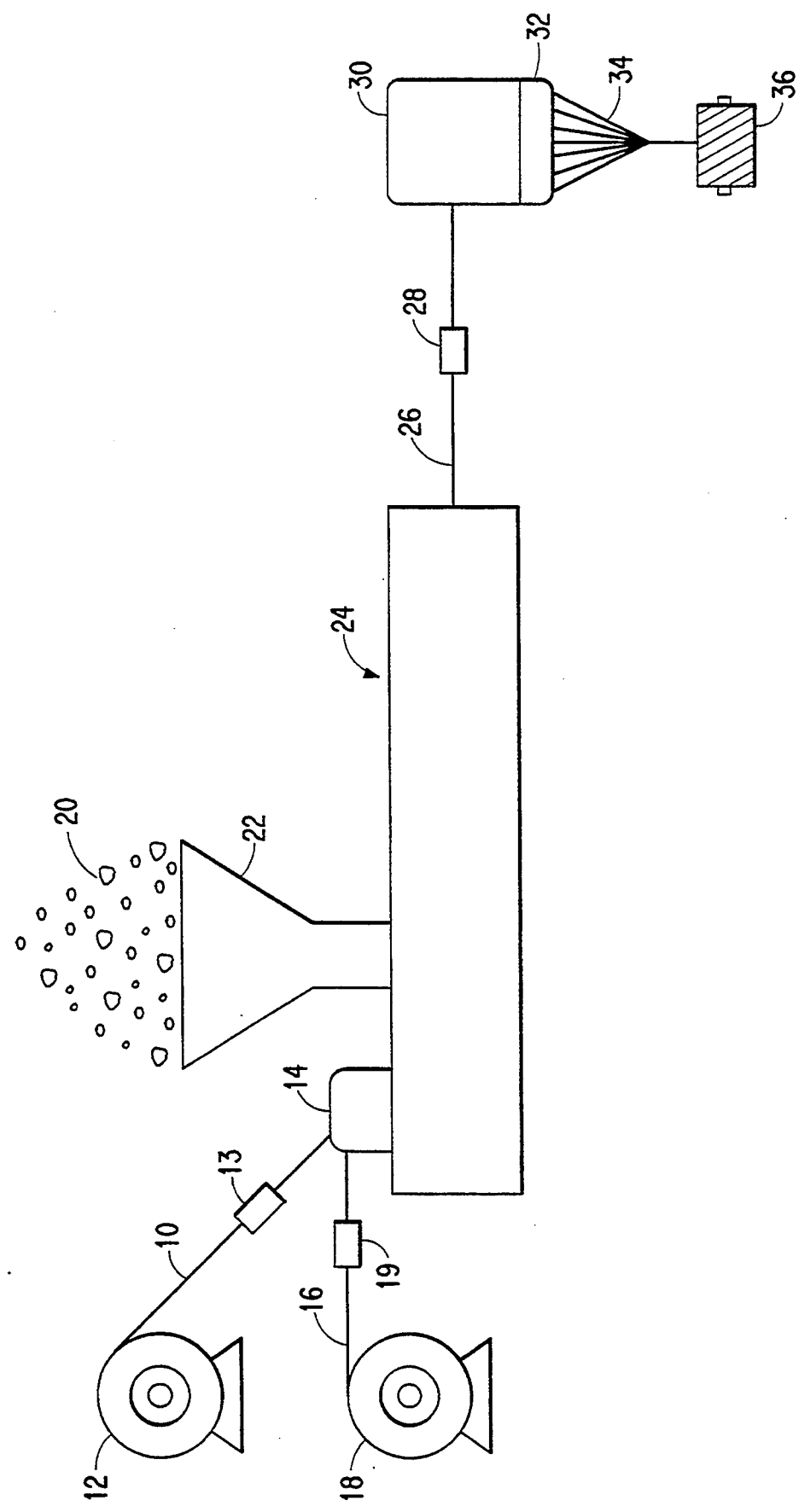
FIG. 1 is a schematic diagram that illustrates the simultaneous addition of multiple additive strands into a process for extruding thermoplastic polymers.

One embodiment of this invention, wherein two "additives" in strand form are fed to a cutting device is shown schematically in FIG. 1. By the term "additives" as used herein, it is meant supplementary materials which are typically added to molten thermoplastic polymers (such as but not limited to nylon, polypropylene, and polyester) for making extruded articles including, but not limited to, pigments, dyes, stabilizers, catalysts, flame retardants, anti-stats, and antimicrobial agents.

The additives are typically dispersed in a polymer matrix to form a strand or ribbon-like material. Each strand is then cut into pellets which are fed to an extruder and mixed therein with molten thermoplastic polymer. In FIG. 1, the resultant molten mixture of polymer and additives is spun through a spinneret to form synthetic fibers. Preferably, nylon fibers are formed. However, this invention is not limited to methods for feeding only two additive strands or to methods wherein the extruded product is fiber. A plurality of strands may be fed to a single cutter, and preferably, the number of strands is in the range of 2 to 6 per cutter. In addition to fibers, the method of this invention may be used to form other thermoplastic shaped articles such as molded plastic articles and films.

Additive strand 10 is fed from strand supply 12 to metering device 13 and on to cutter 14, while strand 16 is simultaneously fed from strand supply 18 to metering device 19 and on to the same cutter 14. Cutter 14 pelletizes the strands for feeding into the extruder 24. Thermoplastic polymer 20 is fed from a polymer supply (not shown) into hopper 22 which feeds extruder 24. Pellets of additives emerging from cutter 14 are co-mixed and co-melted with the thermoplastic polymer and extruded. In this embodiment, the mixture is extruded into a transfer line 26 and pumped by a metering pump 28 to a spin pack 30 and through a spinneret 32 into filaments 34 which are then wound onto a package 36.

Figure 2:
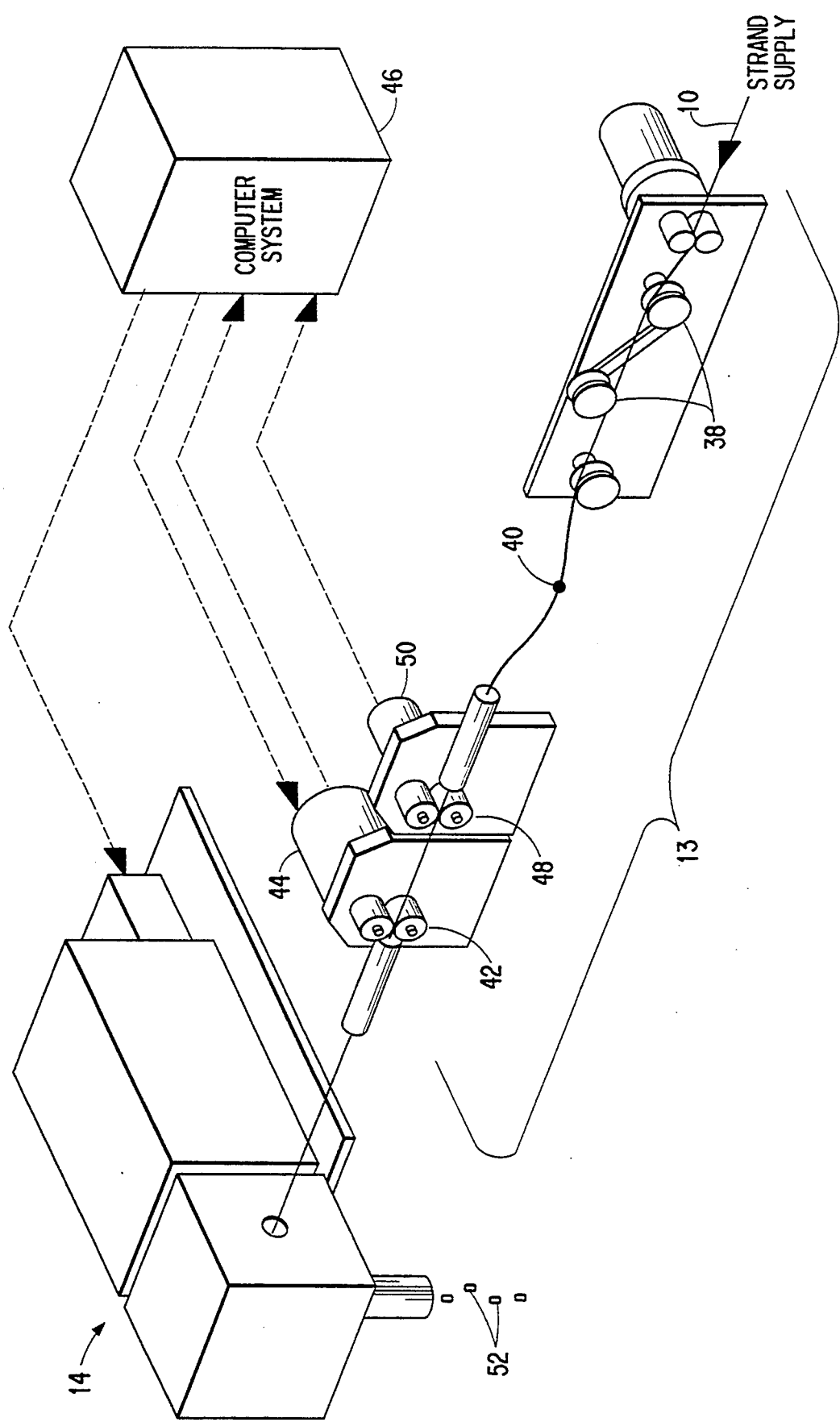
FIG. 2 is a schematic diagram of a process for metering an additive strand to a cutter.

The strand metering device for strand 10 and the cutter 14 are shown schematically in FIG. 2. It should be understood that each strand being fed to the cutter has its own metering means similar to that shown for strand 10. Strand 10 is first fed to dancer rolls 38 which reduce the tension on strand 10 to approximately 0 grams at point 40. One skilled in the art will recognize that devices other than dancer rolls can be used to reduce strand tension to zero. The strand is then fed through sensor rolls 48 which have a secondary optical encoder 50. Next, the strand is fed through feed rolls 42 which are driven by a servo motor 44 having a primary encoder (not shown) controlled by computer system 46. The low tension on the strand is required in order to prevent slipping on the feed rolls 42. In a preferred embodiment computer system 46 is actually two computers. A local computer controls several metering devices and a supervisory computer controls several local computers. The local computer specifies motor stop and start times, acceleration, speed and strand position. After strand 10 emerges from feed rolls 42, it is fed into cutter 14 which is preferably a rotary cutter. A plurality of strands, preferably 2 to 6, may be fed into this single cutter, the velocity of which is preferably also controlled by the computer system 46. Pellets 52 emerge from the cutter and are fed to the extruder.

Figure 3:
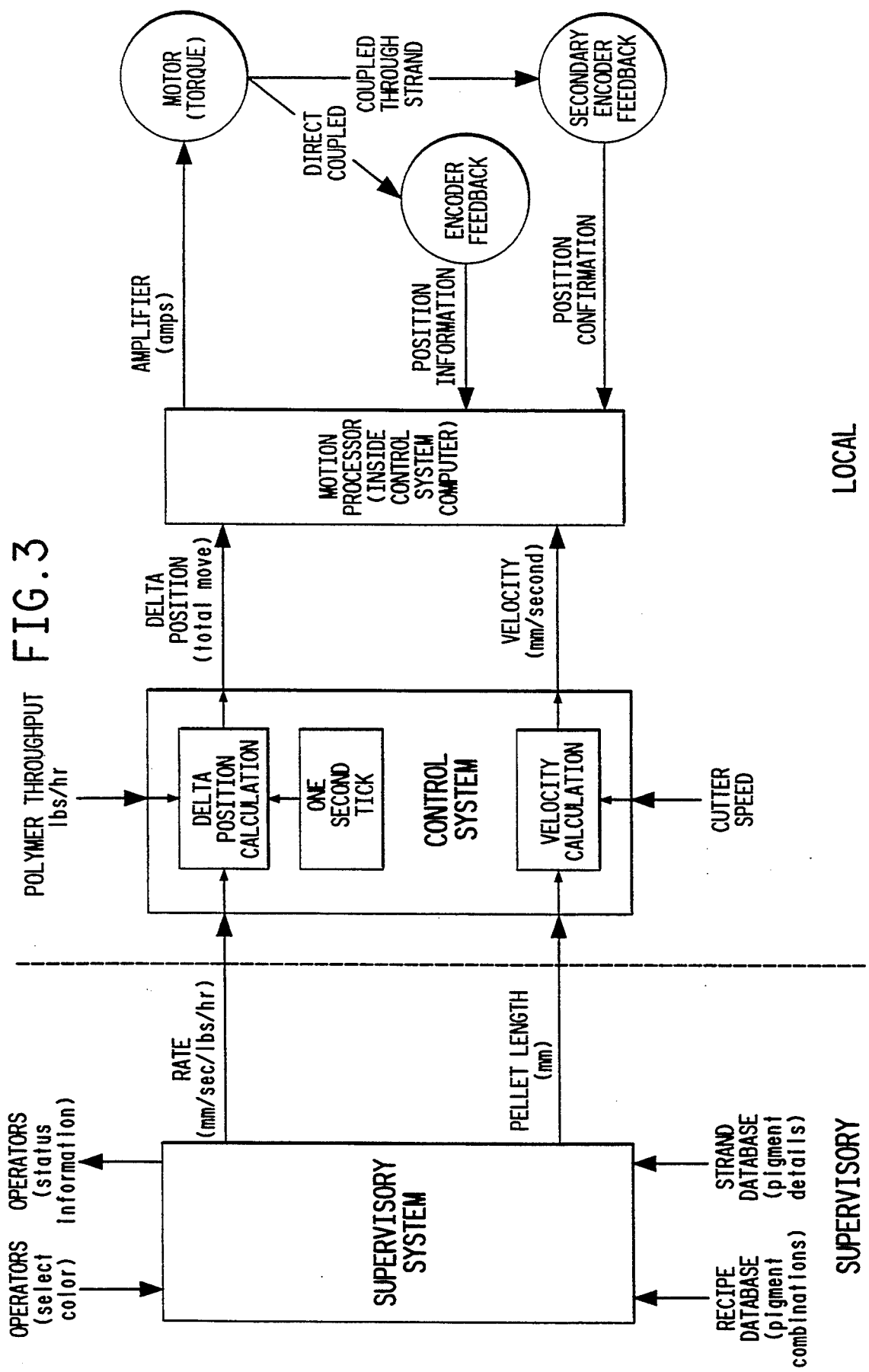
FIG. 3 is a logic flow diagram of the computer operating routines of the invention.

The computer software logic flow diagram for an embodiment of this invention, wherein the strands contain colored pigment and the extruded thermoplastic shaped article is fiber is shown in FIG. 3. The supervisory computer maintains a database of color recipes (i.e., how much of each pigment is needed to make a certain color and shade for a particular fiber product), strand properties (pigment level in strand, linear density, "pigment strength factor"), desired pellet length, cutter velocity, and polymer throughput (extrusion rate) from the extruder. It is known that pigment lots may vary in their ability to color a thermoplastic polymer (coloring power), and this is especially a problem with pigment lots supplied by different manufacturers. The "pigment strength factor" is a numerical value used to account for these differences in coloring power.

When a new color is called for, the supervisory computer retrieves from its database the required % PIF (pigment in fiber), pigment strength factor, pigment level in the strand, and strand linear density. The computer then calculates the required feed rate for each strand needed to make that particular color.

$$\text{Feed Rate} = \frac{(\% \ PIF) \ (\text{pigment strength factor})}{(\text{pigment level in strand}) \ (\text{strand linear density})}$$

The feed rate is in mm of strand per second per pound of fiber-forming polymer extruded per hour (mm/second/lbs/hour) and it is recognized that the units of the variables in the above equation may need to be adjusted before calculating the feed rate. Also, the feed rate should be different for at least two of the strands being fed to the cutter in order to realize the benefits of this invention.

This information is fed to the local computer through two-way serial communications, where the delta position for each strand per feed interval is calculated given the polymer throughput rate from the extruder and the desired feed interval which is typically one second.

$$\text{Delta Position} = (\text{Feed Rate})(\text{polymer throughput})(\text{feed interval})$$

This delta position should also be different for at least two of the strands being fed to the cutter. Rather than storing the polymer throughput in a computer database, in a preferred embodiment, the polymer throughput is constantly monitored (not shown) and the instantaneous polymer throughput is used to calculate the delta position per feed interval. This delta position per feed interval is constantly updated based on the instantaneous polymer throughput. This updating feature is especially useful when multiple fiber-spinning machines are being used and one machine needs to be stopped. The polymer throughput is decreased and the delta position for each strand is automatically adjusted so that the proper color is obtained in the fibers spun from the other spinning machines.

The local computer also calculates the required strand velocity for the strands (in mm/sec) based on the cutter speed (in cuts/sec) and the desired pellet length (in mm). The strand velocity for a rotary cutter, $V_{st}$ is defined as:

$$V_{st} = L \times B \times V_c,$$

where L is the desired pellet length in mm,
B is the number of cutter blades or cuts per blade revolution,
and $V_c$ is the velocity of the cutter in RPS (Revolutions Per Second).

In theory, $V_{st}$ may assume any value (motor limited) consistent with a given cutter velocity and design and the desired pellet length. In a preferred embodiment, $V_{st}$ is kept constant at 300 mm/sec. for each strand while the strand is moving; L=2 mm, B=6 cuts/revolution; and $V_c$=25 revolutions per second.

Preferably, the velocity is the same for each strand being fed into the cutter and this velocity remains constant. However, for each strand, the computer system starts and stops the strand as it is being fed into the cutter so as to produce an extruded product of the desired color and shade. Thus, each strand will move at the same velocity, but in some instances all of the strands will not be moving for the same time. The local computer calculates the total encoder counts (delta position) required for the movement of each strand and sets the speed of servo motor 44 which turns the pair of feed rolls 42 to advance the strand. The movement and position of feed rolls 42 is continuously fed back by encoder counts to the local computer and the speed of servo motor 44 is adjusted accordingly. Thus, the delta position per feed interval for each strand is determined by the movement of feed rolls 42, and the movement of rolls 42 is controlled by the local computer based on the calculated delta position and strand velocity.

The operation of the strand feed control system may be further understood by the timing diagrams in FIG. 4A and FIG. 4B. If, for example, the color recipe and strand parameters are such that more of strand A than strand B is needed to make a particular color fiber and if the strand velocity, Vst, is 300 mm/sec., the timing diagrams illustrate how long each strand moves during a one second feed interval in order to achieve the required delta position for each strand. For each strand At, the time that the strand is moving during a feed interval, is defined by the equation:

$$\Delta \backslash t = \frac{\text{(Feed Rate) (polymer throughput) (feed interval)}}{V_{st}}$$

In FIGS. 4A and 4B, more of strand A is fed to the extruder than strand B ($\Delta/tA > \Delta/tB$) as specified by the color recipe.

In a preferred embodiment, there is an accumulator mechanism such that the total encoder counts are accumulated for each strand until the counts reach the value required for a specified pellet length, for example, 2 mm. Furthermore, the actual position of each strand is constantly monitored by sensor rolls 48 and secondary optical encoder 50. Should the measured total move of the strand in encoder counts as transmitted by optical encoder 50 not match that specified by the local computer for feed rolls 42 as described above, an error occurs initiating suitable corrective action. This action may include various alarm outputs, or start up of alternate strands waiting in back-up mode.

It is recognized that it is not necessary to recall the required recipe, additive feed rate, extrusion rate, cutter speed, pellet length, and the like from a computer database for a specific colored fiber as described above; rather, a local operator may provide input of some or all of this information.

One unique feature of the method of this invention is that the velocity of the cutter remains constant, i.e., the cutter speed does not vary for each strand. Also, except for the first and last pellet, every additive pellet produced from this method is substantially the same size and is easily fed to the extruder. The first and last pellets may be smaller than the others.

The generic name and manufacturer of the apparatus units specified for the preferred embodiments are listed below:

| Element No. | Generic Name | Model No. | Manufacturer |
|---|---|---|---|
| 44 | Feed servo motor with primary encoder | G12MY/E | IMC Magnetics |
| 50 | Secondary encoder | H25F020BO3-0250 | DRC |
| 46 | Supervisory computer | 386 microprocessor | Generic |
| 46 | Local computer | 386 MICROPROCESSOR | Generic |
| 52 | Cutter | USAFED-20FA2K | Yaskawa |

I claim:
1. A method for introducing additives into an extruder for making thermoplastic shaped articles comprising the steps of feeding additives in the form of a plurality of strands to a cutter, wherein each strand is cut into pellets, and then feeding said pellets to the extruder, wherein the feeding of the strands to the cutter is controlled by the steps comprising:
    a) calculating a feed rate for each strand, said feed rate being different for at least two of the strands;
    b) calculating a velocity for each strand, said velocity being the same for each strand;
    c) calculating a delta position for each strand per feed interval, said delta position being different for at least two of the strands; and
    d) feeding each strand at the calculated velocity for the time needed to move the calculated delta position per feed interval.

2. The method of claim 1, wherein the feed rate for each strand is based on a recipe comprising the desired amount of an additive in the thermoplastic shaped article and the amount of said additive comprising each strand.

3. The method of claim 2, wherein the recipe is recalled from a computer database.

4. The method of claim 1, wherein the velocity for each strand is based on the velocity of the cutter and desired pellet length.

5. The method of claim 4, wherein the velocity of the cutter is constant and each strand is cut into pellets having the same length.

6. The method of claim 4, wherein the velocity of the cutter and the desired pellet length are recalled from a computer database.

7. The method of claim 4, wherein the cutter is a rotary cutter.

8. The method of claim 1, wherein each strand is fed through a separate pair of feed rolls prior to the cutter, and the delta position for each strand is determined by the movement of said feed rolls.

9. The method of claim 8, wherein the movement of each pair of feed rolls is based on the feed rate of the strand being fed through said feed rolls and polymer extrusion rate from the extruder.

10. The method of claim 9, wherein the movement of the feed rolls is controlled by a computer so that each pair of feed rolls moves the strand being fed through its rolls at the calculated strand velocity for a period of time necessary to move the strand its calculated delta position per feed interval.

11. The method of claim 9, wherein the feed rate for each strand and the extrusion rate is recalled from a computer database.

12. The method of claim 1, wherein the number of strands is in the range of 2 to 6 per cutter.

13. The method of claim 12, wherein the additives are color concentrates comprising pigments dispersed in a polymer matrix.

14. The method of claim 13, wherein the thermoplastic shaped article is a colored fiber.

* * * * *